United States Patent [19]

Duffy, Jr.

[11] Patent Number: 5,535,969
[45] Date of Patent: Jul. 16, 1996

[54] FOLD OVER SCISSORS CLIP

[75] Inventor: William J. Duffy, Jr., Rochester Hills, Mich.

[73] Assignee: Illinois Tool Works Inc., Glenview, Ill.

[21] Appl. No.: 209,718

[22] Filed: Mar. 14, 1994

[51] Int. Cl.[6] .................................................. F16L 3/22
[52] U.S. Cl. ........................... 248/68.1; 24/487; 248/71; 403/397
[58] Field of Search ................... 248/68.1, 67.7, 248/67.5, 65, 73, 74.1, 74.2, 71; 24/487, 16 R, 17 PB, 458; 403/389, 396, 397

[56] References Cited

U.S. PATENT DOCUMENTS

| | | | |
|---|---|---|---|
| 1,585,840 | 5/1926 | Fahnestock . | |
| 2,166,916 | 7/1939 | Lombard | 24/73 |
| 3,489,847 | 1/1970 | Netzel | 174/146 |
| 3,599,915 | 8/1971 | Soltysik | 248/68.1 |
| 4,131,257 | 12/1978 | Sterling | 248/67.5 |
| 4,431,152 | 2/1984 | Reed, Jr. | 248/65 |
| 4,467,987 | 8/1984 | Small | 248/68.1 |
| 4,470,179 | 9/1984 | Gollin et al. | 248/74.2 X |
| 4,566,660 | 1/1986 | Anscher et al. | 248/74.2 |
| 4,660,790 | 4/1987 | Muz | 248/68.1 |
| 4,840,333 | 6/1989 | Nakayama | 248/68.1 |
| 4,881,705 | 11/1989 | Kraus | 248/74.2 |
| 4,936,530 | 6/1990 | Wollar | 248/71 |
| 5,029,782 | 7/1991 | Andre et al. | 248/68.1 |
| 5,271,587 | 12/1993 | Schaty et al. | 248/74.1 X |

*Primary Examiner*—Ramon O. Ramirez
*Attorney, Agent, or Firm*—Schwartz & Weinrieb

[57] ABSTRACT

A clip for mounting at least one element includes a base member having a first rigid engagement member for engaging the element, and a first substantially flexible arm member for resiliently engaging the element. A cover member is also included for cooperative engagement with the base member and has a second rigid engagement member for engaging the element, and a second substantially flexible arm member for resiliently engaging the element, wherein the first and second rigid engagement members and the first and second substantially flexible arms cooperate to capture the element therebetween.

22 Claims, 2 Drawing Sheets

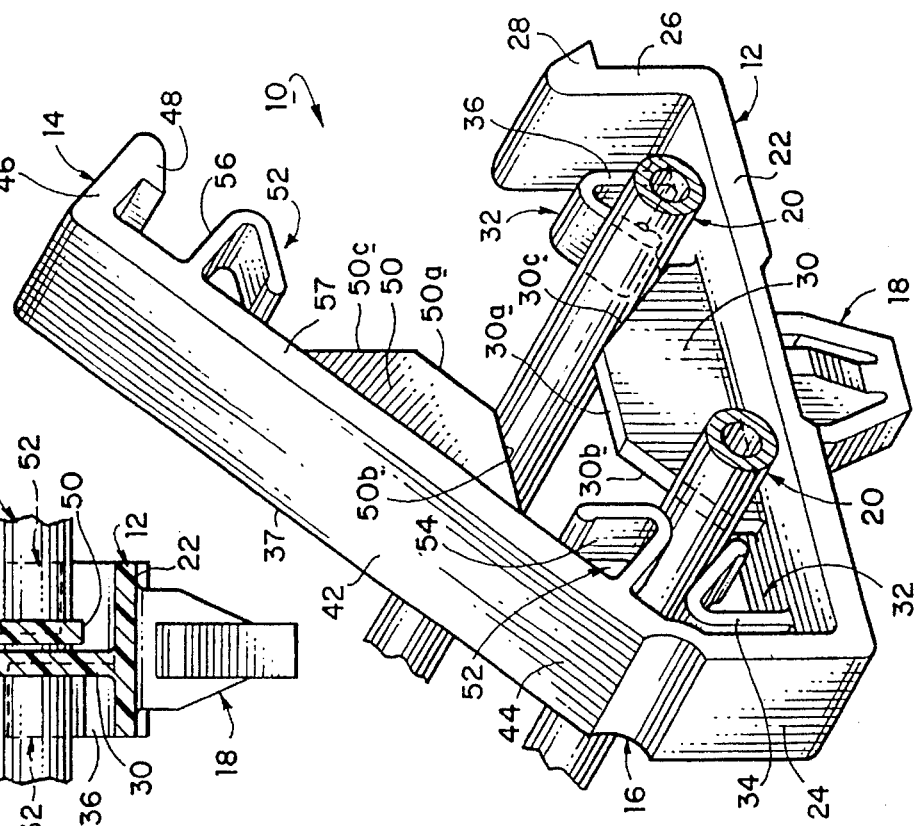
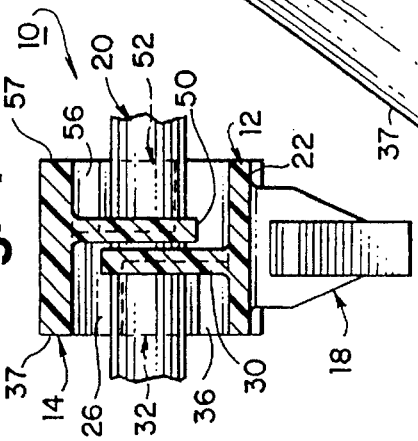
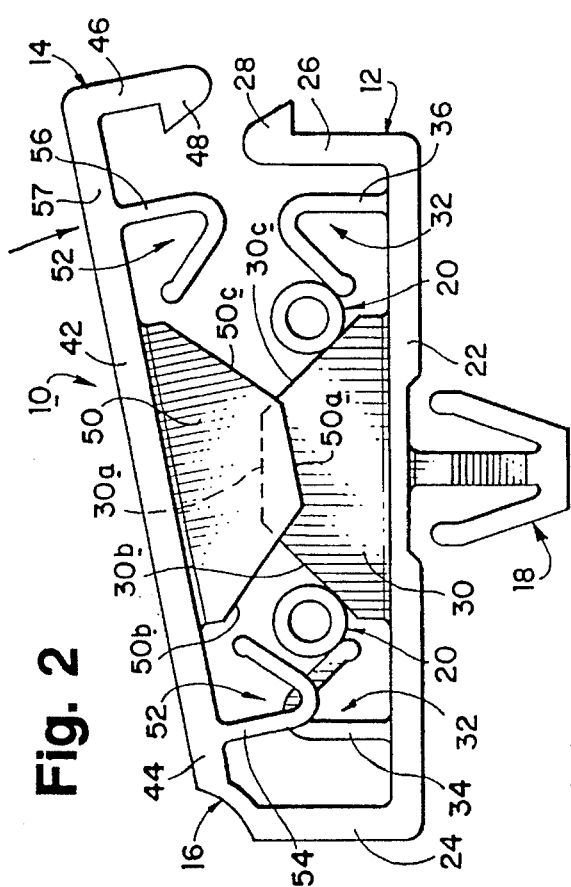
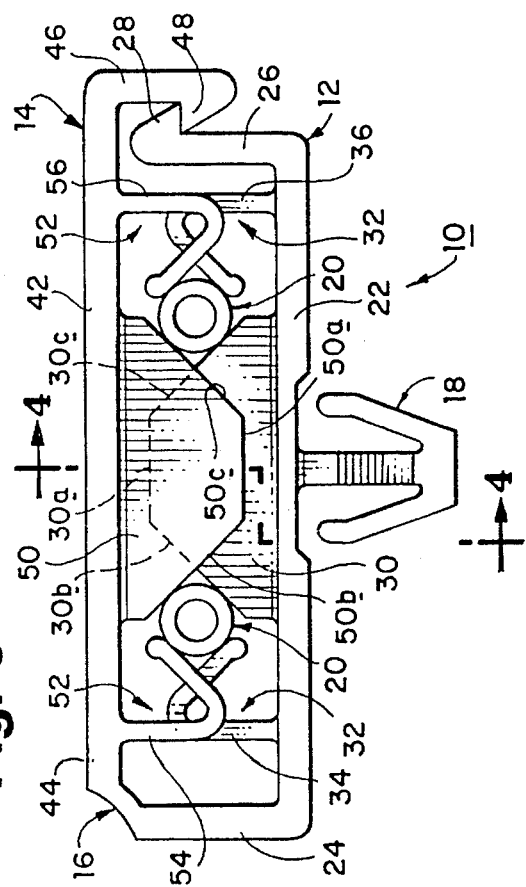

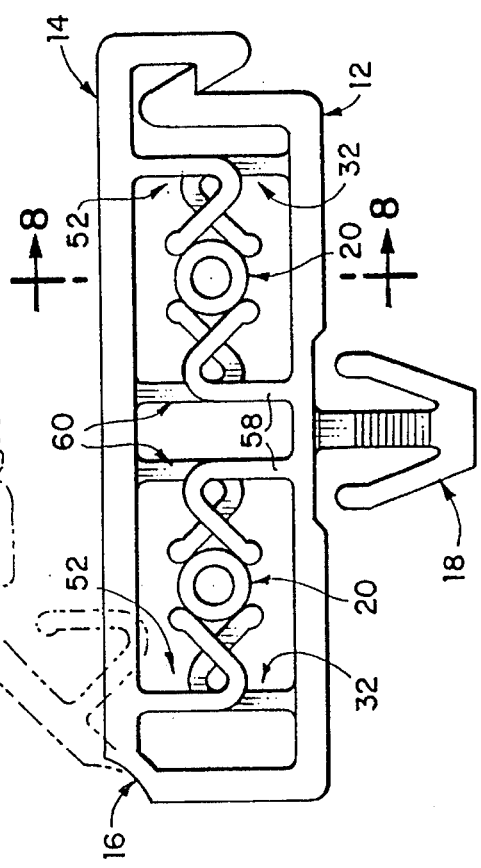
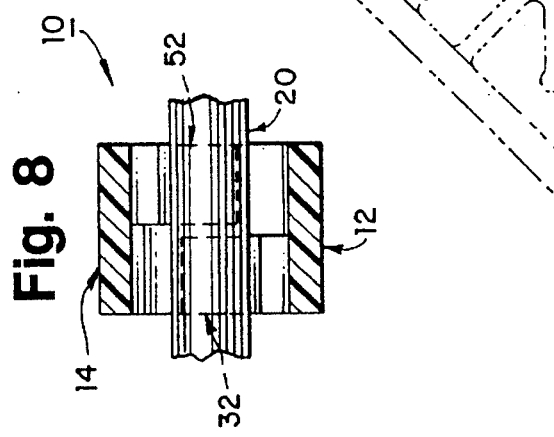
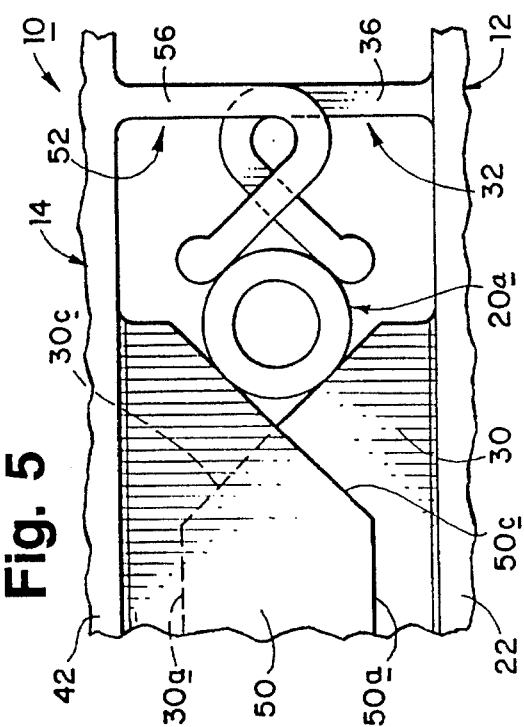

FOLD OVER SCISSORS CLIP

TECHNICAL FIELD

This invention relates generally to clips, and more particularly to a tube clip, wiring harness or the like which is utilized to attach one or more elongate or tubular elements to another article wherein the clip can accommodate elements within a particular range of sizes where each element can be the same or different size within that range, no orientation of the elements is required and the elements are self-centered within the clip.

BACKGROUND OF THE INVENTION

Tube or hose clips are typically utilized in automobile, appliance or other types of manufacturing to attach an elongate member, such as a fluid line, hose or wire, to a support structure of the automobile or appliance. Such tube clips, however, are typically limited to handling one specific type or size of elongate member.

An example of a tube clip which is capable of accepting different sizes of tubes is disclosed in U.S. Pat. No. 4,881,705. That patent includes a plastic housing having one or more bearing portions formed of softer material, similar to rubber, by a "two shot" injection molding process. The softer material of the bearing portions directly engages the tubes.

The clip of that patent, however, is difficult to mold due to the two shot process and the structural details which must be provided. Additionally, that clip does not self-center the tubes, which is desired in some applications to provide a constant center line regardless of tube size. That clip also may permit longitudinal movement of the tubes within the clip.

It therefore is desirable to provide a one-piece tube clip for mounting at least one elongate or tubular element to a support member that can accommodate elements of different sizes, simultaneously accommodate two or more elements of different sizes without having to orient the elements, prevents longitudinal movement of the elements within the clip, and self-centers the elements within the clip.

SUMMARY OF THE INVENTION

The invention provides a clip for mounting at least one element thereto wherein the clip includes a base member having a first rigid engagement member and a first substantially flexible engagement arm for resiliently engaging the element. A cover member is also included for cooperative engagement with the base member wherein the cover member includes a second rigid engagement member and a second substantially flexible engagement arm both of which also engage the element. When assembled, the first and second rigid engagement members and the first and second substantially flexible arm members capture the element therebetween.

Preferably, the clip is designed to accommodate a pair of elongate tubular members wherein the first and second rigid engagement members contact both of the tubular members. The base member and cover member include a pair of substantially flexible arm members, one arm member of each pair contacting a respective tubular member.

Various other objects, features, and attendant advantages of the present invention will be more fully appreciated from the following detailed description when considered in connection with the accompanying drawings in which like reference characters designate like or corresponding parts throughout the several views, and wherein:

BRIEF DESCRIPTION OF THE DRAWINGS

FIG. 1 is a perspective view of an embodiment of the clip of the invention illustrated in an open position with two elongate tubular members positioned therein;

FIG. 2 is a front elevational view of the clip of FIG. 1 in a partially closed position;

FIG. 3 is a front elevational view, similar to FIG. 2, illustrating the clip in a closed position with the tubular elements captured therein;

FIG. 4 is a cross-sectional view taken along line 4—4 of FIG. 3 in the direction indicated;

FIG. 5 is an enlarged front elevational view, in partial section, of the clip of FIGS. 1–4 illustrating a tubular member having a relatively small diameter being secured within the clip;

FIG. 6 is an enlarged front elevational view, similar to FIG. 5, illustrating a tubular member having a relatively large diameter being secured within the clip;

FIG. 7 is a front elevational view of another embodiment of the clip of the invention illustrating a closed position of the clip in solid lines and an open position of the clip partially illustrated in dotted lines; and FIG. 8 is a cross-sectional view taken along line 8—8 of FIG. 7 in the direction indicated illustrating the closed position of the clip.

DESCRIPTION OF THE PREFERRED EMBODIMENTS

Referring to FIG. 1, an embodiment of the clip of the invention is designated generally by reference numeral 10. The clip 10 substantially includes a base member 12 and a cover member 14 which are connected by a hinge member 16.

The clip 10 is preferably formed in one-piece from plastic, but the particular material, shape and size of the clip 10 can vary. To secure the clip 10 to a support member (not illustrated), the base 12 preferably includes a fastener member 18 for insertion within an aperture of the support member.

The clip 10 is preferably is utilized to releasably secure one or more elongate or tubular elements 20 therein, such as a brake or fuel line of an automobile. Although the tubular elements 20 are illustrated as tubes or hoses, it is to be understood that the tubular elements 20 can be any type of element or elongate member including a rod, wiring or the like. Additionally, the clip 10 can be configured to accommodate more than two elements 20 (not illustrated) without departing from the teachings of the present invention.

Briefly, in use, the tubular elements 20 are inserted within the base member 12, the structural details of which will be provided hereinafter. The cover member 14 is then folded over or rotated about the hinge 16 and secured to the base member 12 with a latch mechanism as described in detail below. The tubular elements 20 are retained within the clip 10 which can then be connected to the support member by means of the fastener 18, if desired.

As FIG. 1 illustrates, the base 12 is substantially U-shaped and is defined by a support member 22 having a predetermined length, width and height, and first and second wall members 24 and 26 integrally formed at opposite ends thereof. The first wall member 24 terminates in the hinge 16 while the second wall member 26 terminates in a first flexible latch member 28.

To engage the tubular elements 20, the support member 22 also includes a first rigid engagement member 30 and a first pair of substantially flexible engagement arms 32. The first rigid engagement member 30 includes a first edge 30a and first and second tapered or inclined edges 30b and 30c. The first pair of arms 32 includes a first arm 34 and a second arm 36 formed on opposite ends of the support member 22 and toward a rear edge 37 thereof.

The cover 14 is substantially L-shaped and includes a support member 42 having a predetermined length, width and height, a first end 44, and a wall member 46 formed opposite the first end 44. The first end 44 terminates in the hinge 16 while the wall member 46 terminates in a second flexible latch member 48 for releasable engagement with the first latch member 28.

To engage the tubular elements 20, the support member 42 also includes a second rigid engagement member 50 and a second pair of substantially flexible engagement arms 52. The second rigid engagement member 50 includes a first edge 50a, and first and second tapered or inclined edges 50b and 50c. The second pair of arms 52 includes a third arm 54 and a fourth arm 56 formed on opposite ends of the support member 42 and toward a front edge 57 thereof.

As FIG. 4 illustrates, the first and second rigid engagement members 30 and 50 as well as the first and second pairs of arms 32 and 52 of the base 12 and cover 14 respectively are formed slightly off-center with respect to the support members 22 and 42. Accordingly, as FIGS. 2 and 3 illustrate, when the base 12 is engaged with the cover 14, the first and second rigid engagement members 30 and 50 and the first and second pairs of arms 32 and 52 overlap.

As FIGS. 5 and 6 illustrate, the clip 10 provides a "scissors" type engagement and can accommodate tubular members 20a having a relatively small diameter as well as tubular elements 20b having a relatively large diameter. Additionally, since the different tubular elements 20a and 20b are accommodated by compressing or flexing the flexible arms 34, 36 or 54, 56, the clip 10 is substantially self-centering.

For example, due to the configuration of the clip 10, the vertical position of the tubular members 20a and 20b remains substantially fixed with respect to the height of the clip 10. The tubular members merely move horizontally between the "scissors" action of the rigid engagement members 30 and 50 toward the flexible arms 34, 36 or 54, 56 so as to be captured within the clip 10. The particular size or diameter of the tubular elements 20 can vary depending on the particular application and determines how far the rigid engagement members 30 and 50 push the tubular elements 20 horizontally against the arms 34, 36 and 54, 56.

The specific design of the flexible arms 34, 36 or 54, 56 also firmly holds the tubular elements 20 in position so as to resist longitudinal movement of the tubular elements 20 within the clip 10. This feature is provided by the flexing of the arms 34, 36 or 54, 56 into an "over-center" position with respect to a central axis of the tubular elements 20. Accordingly, the tubular elements 20 cannot be removed without opening the clip 10.

It is to be noted that the clip 10 holds each tubular element 20 at four points. Two of the points are rigid and are provided by the rigid engagement members 30 and 50. The remaining two points are flexible and are provided by the pairs of flexible arms 32 and 52. Thus, the same amount of contact is provided throughout the range of sizes of the tubular elements 20 and prevents rattling from vibrations.

FIGS. 7 and 8 illustrate another embodiment of the present invention where similar elements are identified with the same reference numerals. In this embodiment, the first and second rigid engagement members 30 and 50 are replaced with another pair of flexible engagement arms 58 and 60 on the base member 12 and cover member 14 respectively.

The two pairs of flexible arms 58 and 60 engage the tubular elements 20 in a manner similar to the pairs of flexible arms 32 and 52 described above. In this embodiment, however, self-centering of the tubular member 20 is achieved in both a vertical and a horizontal direction with respect to FIG. 7 regardless of the diameter of the tubular element 20 being utilized. This action centers the tubular elements 20 with respect to both the height and length of the clip 10.

It is to be noted that in the embodiments of FIGS. 1–6 or 7 and 8, the orientation of tubular elements 20 of the same or different diameters is irrelevant. This can significantly reduce assembly time especially when a number of tubular elements 20 are utilized.

Additionally, although a particular clip 10 is designed to accommodate tubular elements 20 of a particular size range, the clip 10 can be made larger or smaller to vary that range as desired. Accordingly, the invention is not to be limited by the size of the tubular elements 20.

Modifications and variations of the present invention are possible in light of the above teachings. It is to be understood that within the scope of the claims, the invention may be practiced otherwise than specifically described.

I claim:

1. A clip for mounting at least one element, comprising:
    a base member having a first rigid engagement member for engaging said at least one element, and a first substantially flexible engagement arm for resiliently engaging said at least one element; and
    a cover member for cooperative engagement with said base member and having a second rigid engagement member for engaging said at least one element, and a second substantially flexible engagement arm for resiliently engaging said at least one element,
    wherein said first and second rigid engagement members of said base member and said cover member, and said first and second substantially flexible arms of said base member and said cover member, cooperate to capture said at least one element therebetween.

2. The clip as defined in claim 1, wherein:
    said base member and said cover member can capture different sized elements, whose size can vary within a predetermined range, therebetween.

3. The clip as defined in claim 1 wherein said clip includes a length, width and height where said base member and said cover member self-center said at least one element with respect to said height of said clip.

4. The clip as defined in claim 3 wherein said base member and said cover member self-center said at least one element with respect to both said height and said length of said clip.

5. The clip as defined in claim 1 wherein respective portions of said base member and said cover member are connected by a hinge and a latch mechanism.

6. The clip as defined in claim 1 including a fastening member for connecting said clip to a support member.

7. A clip for mounting a plurality of cylindrical elements, comprising:

a base member having a first rigid engagement member for engaging a pair of cylindrical elements, and a first pair of substantially flexible engagement arms, each arm being disposed for engagement with a respective cylindrical element; and a cover member for cooperative engagement with said base member and including a second rigid engagement member for engagement with said pair of cylindrical elements, and a second pair of substantially flexible engagement arms, each arm being disposed for engagement with a respective cylindrical element, wherein said first and second rigid engagement members of said base member and said cover member, and said first and second pairs of substantially flexible engagement arms of said base member and said cover member cooperate so as to capture said cylindrical elements therebetween.

8. The clip as defined in claim 7 wherein said cylindrical elements vary in size within a predetermined range and said clip captures said elements at discrete positions within said clip, each position capable of accommodating any element within said range regardless of its size.

9. The clip as defined in claim 7 wherein said clip includes a length, width and height and said clip self-centers said elements with respect to said height of said clip.

10. The clip as defined in claim 9 wherein said clip self-centers said elements with respect to both said height and said length of said clip.

11. The clip as defined in claim 7 wherein respective portions of said base member and said cover member are connected by a hinge and latch mechanism.

12. The clip as defined in claim 7 including a fastening member for connecting said clip to a support member.

13. The clip as defined in claim 7 wherein said base member includes a plurality of rigid engagement members and a plurality of substantially flexible engagement arms and said cover member includes a plurality of rigid engagement members and a plurality of substantially flexible engagement arms for capturing a desired number of cylindrical elements therebetween.

14. A clip for mounting a pair of elongate elements, comprising:

a base member having first and second pairs of substantially flexible engagement arms, each one of said pairs of arms being disposed for engagement with a respective elongate element; and a cover member, movable between an uncovered position with respect to said base member and a covered position with respect to said base member, including third and fourth pairs of substantially flexible engagement arms, each one of said pairs of arms being disposed for engagement with a respective elongate element, wherein said first and second pairs of flexible engagement arms of said base member cooperate with said third and fourth pairs of flexible engagement arms of said cover member so as to capture said elongate elements therebetween.

15. The clip as defined in claim 14 wherein said base member and said cover member capture elongate elements of different diameters within a predetermined range.

16. The clip as defined in claim 14 wherein said clip self-centers a longitudinal center line of said elongate elements with respect to said clip.

17. A clip for mounting at least one elongate element, comprising:

a base member having at least one rigid engagement member for engaging said at least one elongate element, and at least one substantially flexible engagement arm for resiliently engaging said at least one elongate element; and a cover member, movable between an uncovered position with respect to said base member and a covered position with respect to said base member, and having at least one rigid engagement member for engaging said at least one elongate element, and at least one substantially flexible engagement arm for resiliently engaging said at least one elongate element, wherein said rigid engagement members of said base member and said cover member cooperate with each other, when said cover member is moved toward said covered position with respect to said base member, so as to cooperatively engage said elongate element, force said elongate element into engagement with said flexible engagement arms of said base member and said cover member, and cause said flexible engagement arms of said base member and said cover member to flex a predetermined amount in order accommodate said elongate element having a predetermined diametrical dimension.

18. The clip as set forth in claim 17, further comprising:

fastener means integrally connected to said base member for securing said clip within an aperture of a support panel on which said clip is to be mounted.

19. The clip as set forth in claim 17, further comprising:

hinge means integrally interconnecting first respective end portions of said base member and said cover member so as to permit said cover member to be pivotably moved with respect to said base member between said uncovered position and said covered position;

first latching means disposed upon a second end portion of said base member; and second latching means disposed upon a second end portion of said cover member for engaging said first latching means of said base member so as to retain said cover member in a latched state when said cover member is disposed at said covered position with respect to said base member.

20. A clip for mounting at least one elongate element, comprising:

a base member having at least one pair of substantially flexible engagement arms for respectively resiliently engaging said at least one elongate element; and a cover member, movable between an uncovered position with respect to said base member and a covered position with respect to said base member, and having at least one pair of substantially flexible engagement arms for respectively resiliently engaging said at least one elongate element, wherein said engagement arms of said cover member cooperate with each other, when said cover member is moved toward said covered position with respect to said base member, so as to cooperatively engage said elongate element, force said elongate element into pressured engagement with said engagement arms of said base member, and cause said flexible engagement arms of said base member and said cover member to flex a predetermined amount in order to accommodate said elongate element having a predetermined diametrical dimension.

21. The clip as set forth in claim 20, further comprising:

hinge means integrally interconnecting first respective end portions of said base member and said cover member so as to permit said cover member to be pivotably moved with respect to said base member between said uncovered and covered positions;

first latching means disposed upon a second end portion of said base member; and second latching means disposed upon a second end portion of said cover member for engaging said first latching means of said base member so as to retain said cover member in a latched state with respect to said base member when said cover member is disposed at said covered position with respect to said base member.

22. The clip as set forth in claim 20, further comprising:

fastener means integrally connected to said base member for securing said clip within an aperture of a support panle on which said clip is to be mounted.

* * * * *